United States Patent
Xu

(10) Patent No.: US 12,184,564 B2
(45) Date of Patent: Dec. 31, 2024

(54) METHOD FOR DETERMINING DOWNLINK CONTROL INFORMATION TYPE, AND APPARATUS

(71) Applicant: GUANGDONG OPPO MOBILE TELECOMMUNICATIONS CORP., LTD., Dongguan (CN)

(72) Inventor: Weijie Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 258 days.

(21) Appl. No.: 17/682,525

(22) Filed: Feb. 28, 2022

(65) Prior Publication Data
US 2022/0190981 A1 Jun. 16, 2022

Related U.S. Application Data

(63) Continuation of application No. PCT/CN2019/116801, filed on Nov. 8, 2019.

(51) Int. Cl.
*H04L 5/00* (2006.01)
*H04L 1/1607* (2023.01)

(52) U.S. Cl.
CPC .......... *H04L 5/0032* (2013.01); *H04L 1/1671* (2013.01); *H04L 5/0094* (2013.01)

(58) Field of Classification Search
CPC .... H04L 5/0032; H04L 1/1671; H04L 5/0094
(Continued)

(56) References Cited

U.S. PATENT DOCUMENTS

2018/0352564 A1* 12/2018 Ye .................. H04W 72/21
2019/0149275 A1* 5/2019 He .................. H04L 65/1016
370/329
(Continued)

FOREIGN PATENT DOCUMENTS

CN 101646224 A 2/2010
CN 102195742 A 9/2011
(Continued)

OTHER PUBLICATIONS

Yang et al., U.S. Appl. No. 62/931,752 English Translation, Nov. 6, 2019, pp. 1-107.*
(Continued)

*Primary Examiner* — Anthony Mejia
(74) *Attorney, Agent, or Firm* — BAYES PLLC

(57) ABSTRACT

The present application provides a method for determining a downlink control information type and an apparatus. The method comprises: a terminal apparatus receiving DCI; the terminal apparatus determining a type of the DCI according to a bit value of a first bit field in the DCI, and/or the terminal apparatus determining the type of the DCI according to a radio network temporary identity (RNTI) used to scramble a cyclic redundancy check (CRC) portion of the DCI, wherein the DCI comprises a first type of DCI and a second type of DCI, the first type of DCI is used to schedule data and instruct the terminal apparatus to operate in a dormant bandwidth part (BWP) or a non-dormant BWP on a secondary cell, and the second type of DCI is used to instruct the terminal apparatus to operate in a dormant BWP or a non-dormant BWP on the secondary cell.

20 Claims, 3 Drawing Sheets

(58) Field of Classification Search
 USPC .......................................................... 370/329
 See application file for complete search history.

(56) References Cited

U.S. PATENT DOCUMENTS

| | | | | |
|---|---|---|---|---|
| 2019/0246378 | A1* | 8/2019 | Islam | H04L 1/1819 |
| 2019/0363843 | A1* | 11/2019 | Gordaychik | H04L 1/08 |
| 2020/0382354 | A1* | 12/2020 | Sengupta | H04L 5/001 |
| 2021/0176030 | A1* | 6/2021 | Tsai | H04W 72/23 |
| 2022/0109547 | A1* | 4/2022 | Svedman | H04L 5/0098 |
| 2022/0174601 | A1* | 6/2022 | Chen | H04W 72/1263 |
| 2022/0303100 | A1* | 9/2022 | Yang | H04L 1/1861 |

FOREIGN PATENT DOCUMENTS

| | | | |
|---|---|---|---|
| CN | 108293256 A | 7/2018 | |
| CN | 109088707 A | 12/2018 | |
| WO | WO-2020198356 A1 * | 10/2020 | ........... H04L 1/1671 |

OTHER PUBLICATIONS

Hearing Notice issued in corresponding Indian application No. 202217011153, mailed Dec. 15, 2023.
Controller Decision issued in corresponding Indian application No. 202217011153, mailed Feb. 8, 2024.
International Search Report issued in corresponding International Application No. PCT/CN2019/116801, mailed Jul. 29, 2020, 32 pages.
Written Opinion of the International Searching Authority issued in corresponding International Application No. PCT/CN2019/116801, mailed Jul. 29, 2020, 7 pages.
First Office Action issued in corresponding European application No. 19951349.0, mailed Dec. 23, 2022.
First Office Action issued in corresponding Chinese application No. 202210101175.6, mailed Apr. 19, 2023.
Notice of Allowance issued in corresponding European application No. 19951349.0, mailed Jul. 3, 2023.
Notice of Allowance issued in corresponding Chinese application No. 202210101175.6, mailed Jul. 11, 2023.
Extended European Search Report issued in corresponding European application No. 19951349.0, mailed Jul. 6, 2022.
First Office Action issued in corresponding Indian application No. 202217011153, mailed Jul. 8, 2022.
Nokia et al., "RAN1 agreements for Multi-RAT Dual-Connectivity and Carrier Aggregation enhancements (LTE, NR)", R1-1911737, 3GPP TSG RAN WG1 Meeting #98bis Chongqing, P.R. China, Oct. 14-20, 2019.
Qualcomm Incorporated, "Fast SCell Activation and SCell Dormancy", R1-1911139, 3GPP TSG-RAN WG1 #98bis Chongqing, China, Oct. 14-20, 2019.
Samsung, "Remaining issue on DL SPS", R1-1800458, 3GPP TSG RAN WG1 #AH 1801 Vancouver, Canada, Jan. 22-26, 2018.

* cited by examiner

METHOD FOR DETERMINING DOWNLINK CONTROL INFORMATION TYPE, AND APPARATUS

CROSS-REFERENCE TO RELATED APPLICATION

This application is a continuation of International Application No. PCT/CN2019/116801, entitled "METHOD FOR DETERMINING DOWNLINK CONTROL INFORMATION TYPE, AND APPARATUS", filed on Nov. 8, 2019, the contents of which are incorporated herein by reference in its entirety.

TECHNICAL FIELD

The present disclosure relates to the field of communications, and more particularly, to a method for determining downlink control information type, and apparatus.

RELATED ART

In order to realize energy saving of a terminal device, it is proposed to support a dormancy behavior of the terminal device on a secondary cell (Scell) at present. The dormancy behavior of the terminal device on the Scell may mean that the terminal device does not monitor a physical downlink control channel (PDCCH) on the Scell.

A network device may instruct the terminal device to enter the dormancy behavior of the Scell through downlink control information (DCI). At present, there are two types of DCI that may be used for indicating the terminal device to enter the dormancy behavior of the Scell. One type of DCI may be not only used for indicating the terminal device to enter the dormancy behavior of the Scell, but also used for scheduling data, and the other type of DCI is only used for indicating the terminal device to enter the dormancy behavior of the Scell.

SUMMARY

The present disclosure provides a method for determining a downlink control information type and an apparatus.

In a first aspect, there is provided a method for determining a downlink control information type, including: receiving, by a terminal device, downlink control information (DCI); determining, by the terminal device, a type of the DCI according to a bit value of a first bit field in the DCI, and/or determining, by the terminal device, the type of the DCI according to a radio network tempory identity (RNTI) used for scrambling a cyclic redundancy check (CRC) of the DCI, wherein the DCI comprises a first type of DCI and a second type of DCI, the first type of DCI is used for scheduling data and indicating that the terminal device operates on a dormant bandwidth part (BWP) or a non-dormant BWP in a secondary cell, and the second type of DCI is used for indicating that the terminal device operates on the dormant BWP or the non-dormant BWP in the secondary cell.

In a second aspect, there is provided a method for determining downlink control information type, including: sending, by a network device, downlink control information (DCI), wherein the DCI includes a first bit field, and a bit value of the first bit field is used for indicating a type of the DCI, and/or a radio network tempory identity (RNTI) used for scrambling a cyclic redundancy check (CRC) of the DCI is used for indicating the type of the DCI; wherein the DCI includes a first type of DCI and a second type of DCI, the first type of DCI is used for scheduling data and indicating that the terminal device operates on a dormant bandwidth part (BWP) or a non-dormant BWP in a secondary cell, and the second type of DCI is used for indicating that the terminal device operates on the dormant BWP or the non-dormant BWP in the secondary cell.

In a third aspect, there is provided a terminal device, configured to perform the method in the first aspect or any of the implementations thereof.

Specifically, the terminal device includes functional modules configured to perform the method in the first aspect or any of the implementations thereof.

In a fourth aspect, there is provided a network device, configured to perform the method in the second aspect or any of the implementations thereof.

Specifically, the network device includes functional modules configured to perform the method in the second aspect or any of the implementations thereof.

In a fifth aspect, there is provided a terminal device, including a processor and a memory. The memory is configured to store a computer program, and the processor is configured to call and run the computer program stored in the memory to execute the method in the second aspect or any of the implementations thereof.

In a sixth aspect, there is provided a network device, including a processor and a memory. The memory is configured to store a computer program, and the processor is configured to call and run the computer program stored in the memory to execute the method in the first aspect or any of the implementations thereof.

In a seventh aspect, there is provided a device, configured to perform the method in any one of the first to second aspects or any of the implementations thereof.

Specifically, the device includes: a processor, configured to call and run a computer program from a memory, so that a device installed with the device performs the method in any one of the first and second aspects or any of the implementations thereof.

In an eighth aspect, there is provided a computer-readable storage medium, configured to store a computer program that causes a computer to perform the method in any one of the first and second aspects or any of the implementations thereof.

In a ninth aspect, there is provided a computer program which, when run on a computer, causes the computer to perform the method in any one of the first and second aspects or any of the implementations thereof.

DETAILED DESCRIPTION

Figure 1:
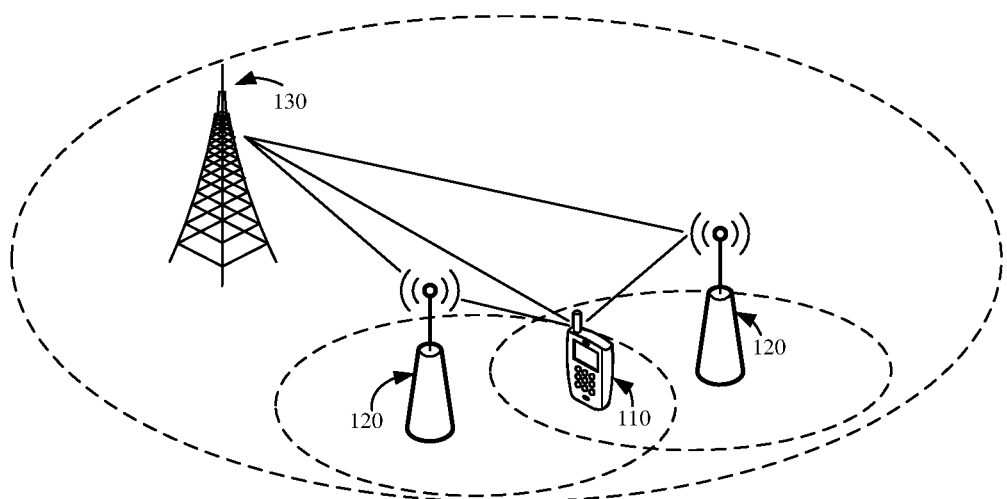
FIG. 1 is a schematic diagram of a wireless communication system applied in an embodiment of the present disclosure.

FIG. 1 is a schematic diagram of a communication system 100 of an implementation of the present disclosure.

As shown in FIG. 1, a terminal device 110 is connected to a first network device 130 under a first communication system and a second network device 120 under a second communication system.

For example, the first network device 130 is a network device under Long Term Evolution (LTE), and the second network device 120 is a network device under New Radio (NR).

Multiple cells may be included under the first network device 130 and the second network device 120.

It should be understood that FIG. 1 is an example of the communication system of an implementation of the present disclosure, and implementations of the present disclosure are not limited to that shown in FIG. 1.

For example, a communication system to which an implementation of the present disclosure is applied may include at least multiple network devices under the first communication system and/or multiple network devices under the second communication system.

For example, the system 100 shown in FIG. 1 may include one master network device under the first communication system and at least one secondary network device under the second communication system. The at least one secondary network device is respectively connected with the primary network device to form a multi-connection, and is respectively connected with the terminal device 110 to provide services for the terminal device 110. Specifically, the terminal device 110 may establish connections simultaneously with the master network device and the secondary network device.

Optionally, the connection established between the terminal device 110 and the primary network device 110 is a primary connection, and the connection established between the terminal device 110 and the secondary network device is a secondary connection. Control signaling of the terminal device 110 may be transmitted through the primary connection, while data of the terminal device 110 may be transmitted through the primary connection and the secondary connection at the same time, or may be transmitted only through the secondary connection.

For another example, the first communication system and the second communication system in implementations of the present disclosure are different, but specific categories of the first communication system and the second communication system are not limited.

For example, the first communication system and the second communication system may be various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Time Division Duplex (TDD) system, a Universal Mobile Telecommunication System (UMTS).

The primary network device and the secondary network device may be any access network devices.

Optionally, in some embodiments, the access network device may be a Base Transceiver Station (BTS) in the GSM or the CDMA system, or may be a NodeB (NB) in the WCDMA system, or may be an Evolutional Node B (eNB or eNodeB) in the LTE system.

Optionally, the access network device may be a base station (gNB) in a Next Generation Radio Access Network (NG RAN) or an NR system or a wireless controller in a Cloud Radio Access Network (CRAN). Or the access network device may be a relay station, an access point, a vehicle device, a wearable device or a network device in a future evolved Public Land Mobile Network (PLMN), etc.

In the system 100 shown in FIG. 1, for example, the first network device 130 is the master network device, and the second network device 120 is the secondary network device.

The first network device 130 may be an LTE network device, and the second network device 120 may be an NR network device. Or the first network device 130 may be an NR network device, and the second network device 120 may be an LTE network device. Or the first network device 130 and the second network device 120 may be both NR network devices. Or the first network device 130 may be a GSM network device or a CDMA network device etc., and the second network device 120 may be a GSM network device or a CDMA network device etc. Or the first network device 130 may be a Macrocell, and the second network device 120 may be a Microcell, a Picocell or a Femtocell, etc.

Optionally, the terminal device 110 may be any terminal device. The terminal device 110 includes, but not limited to:

connection via a wired line, such as connection via public switched telephone networks (PSTN), a digital subscriber line (DSL), a digital cable, and a direct cable; and/or another data connection/network; and/or via a wireless interface, for example, for a cellular network, a wireless local area network (WLAN), a digital television network such as a DVB-H network, a satellite network and an AM-FM broadcast transmitter; and/or an apparatus of another UE, which is configured to receive/transmit a communication signal; and/or an Internet of things (IoT) device. The UE configured to realize communication through a wireless interface may be referred to as a "wireless communication terminal", a "wireless terminal", or a "mobile terminal". Examples of the mobile terminal include, but not limited to, a satellite or cellular phone, and a personal communications system (PCS) terminal that may combine a cellular radiotelephone with data processing, facsimile, and data communication capabilities; a radiotelephone, a pager, an Internet/intranet access, a Web browser, a notepad, a calendar, and/or a personal digital assistant (PDA) of a global positioning system (GPS) receiver; and a conventional laptop and/or palmtop receiver or other electronic apparatuses including radiotelephone transceivers. The UE may refer to an access terminal, UE, a user unit, a user station, a mobile station, a mobile platform, a remote station, a remote terminal, a mobile device, a user terminal, a terminal, a wireless communication device, a user agent, or a user apparatus. The access terminal may be a cellular phone, a cordless telephone, a session initiation protocol (SIP) telephone, a wireless local loop (WLL) station, a PDA, a handheld device having a wireless communication function, a computation device or other processing devices connected to a radio modem, a vehicle device, a wearable device, UE in a 5G network, or UE in the PLMN that will be evolved in the future, and the like.

It should be understood that the terms "system" and "network" herein may often be interchanged herein.

Figure 2:
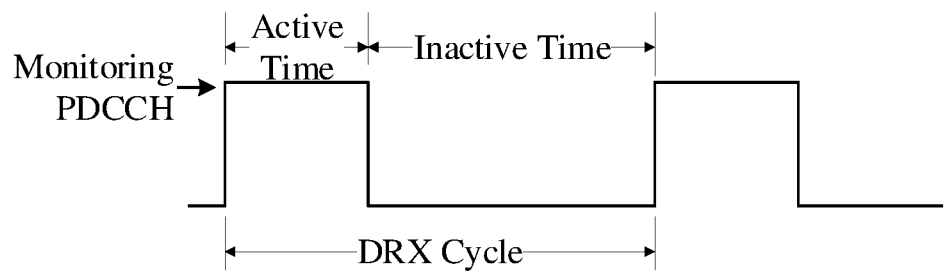
FIG. 2 is a schematic diagram of a DRX cycle provided by an embodiment of the present disclosure.

In consideration of power saving of the terminal, a discontinuous reception (DRX) transmission mechanism is introduced in LTE. When there is no data transmission, power consumption may be reduced by stop receiving PDCCH (blind PDCCH detection will be stopped at this time), thereby increasing battery life. A basic mechanism of DRX is to configure a DRX cycle for a UE in a radio resource control (RRC) connected state. As shown in FIG. 2, a DRX cycle consists of an active time and an inactive time. During "On Duration" time, the UE monitors and receives the PDCCH; during "Opportunity for DRX" time, the UE does not receive the PDCCH to reduce power consumption.

In addition, transmission of a paging message is also a DRX mechanism for a RRC idle state, and the DRX cycle is a cycle of the paging message in this case.

It can be seen from FIG. 2 that in a time domain, time is divided into successive DRX cycles.

In 5G and LTE evolution projects, an enhancement mechanism of DRX is currently being discussed. For example, although the network has configured the DRX mechanism for the terminal, the terminal is only scheduled opportunistically during the periodic active time, and even when terminal service load is very low, the terminal is only scheduled during a few DRX cycles; for the paging message that adopts the DRX mechanism, the terminal has fewer opportunities to receive the paging message. Therefore, after the terminal is configured with the DRX mechanism, there is still PDCCH detection without detecting data scheduling in most active times. If the terminal blindly detects the PDCCH when there is no data scheduling, power for detection is wasted. Therefore, there is room for further optimization for the current DRX mechanism.

A solution provided by the embodiments of the present disclosure is that if the base station determines that it is necessary to schedule the terminal in DRX on duration, it sends an energy-saving signal to the terminal which is used for waking up the terminal, so that the terminal starts a on duration timer in the DRX cycle for PDCCH detection; otherwise, if the base station determines that it is not necessary to schedule the terminal in DRX on duration, it instructs the terminal not to perform the PDCCH detection, thereby avoiding waste of detection power.

DRX on duration is a time period from a starting time of a timer that is the DRX on duration timer started by the terminal device at the start position of the DRX cycle to an ending time or timeout of the timer.

In addition, it is found in research that, the energy-saving signal may also be used for, in addition to being used for waking up the terminal for the PDCCH detection, indicating information such as a target BWP and a configuration of PDCCH search space used by the terminal upon waking up.

In order to realize the energy saving of the terminal, the 3rd generation partnership project (3GPP) currently discusses to support a dormancy behavior of Scell for the terminal. The so-called dormancy behavior of Scell means that the terminal does not monitor the PDCCH on the scell, and only performs related operations, such as channel state information (CSI) measurement, automatic gain control (AGC), beam management, and radio resource management (RRM) measurement.

Further, 3GPP agrees that the dormancy behavior of Scell is realized by switching the terminal to the dormant BWP on the Scell, see the following conclusion. The following conclusion further clarifies that an indication signaling based on layer 1 (L1) is used for indicating whether the terminal triggers the dormancy behavior of Scell, that is, whether to switch to the dormant BWP.

Optionally, the L1 signaling in the embodiments of the present disclosure may be PDCCH that is used to transmit DCI.

In particular, during the DRX active time, two different types of DCI are supported. A first type of DCI is not only used for indicating whether the terminal device operates on the dormant BWP in the secondary cell, but also used for scheduling data, and a second type of DCI is only used for indicating whether the terminal device operates on the dormant BWP in the secondary cell, but is not used for scheduling data.

If the terminal device acquires the first type of DCI, the terminal device may switch a status of the secondary cell according to content of the signaling, and may transmit data scheduled by the network device according to a resource location indicated in the signaling. If the terminal device acquires the second type of DCI, the terminal device may only switch the status of the secondary cell according to the content of the signaling.

It can be seen from the above that during the DRX active time, two different types of DCI are supported. However, there is currently no clear way for the terminal device to determine which type of DCI the acquired DCI is.

Figure 3:
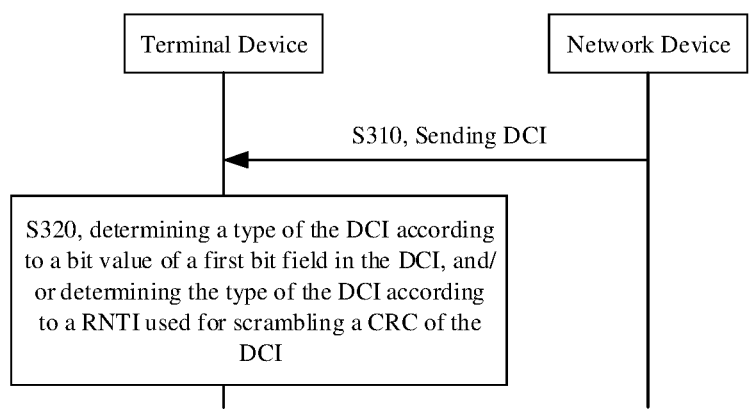
FIG. 3 is a schematic diagram of a method for determining a DCI type provided by an embodiment of the present disclosure.

The embodiments of the present disclosure provide a method for determining a downlink control information type, so that the terminal device may determine which type of DCI the acquired DCI belongs to. As shown in FIG. 3, the method includes steps S310 to S320.

In the S310, a network device sends DCI, and a terminal device receives the DCI.

In the S320, the terminal device determines a type of DCI according to a bit value of a first bit field in the DCI; and/or, the terminal device determines the type of DCI according to a radio network tempory identity (RNTI) used for scrambling a cyclic redundancy check (CRC) of the DCI.

The DCI includes a first type of DCI and a second type of DCI, the first type of DCI is used for scheduling data and indicating that the terminal device operates on a dormant bandwidth part (BWP) or a non-dormant BWP in a secondary cell, and the second type of DCI is used for indicating that the terminal device operates on the dormant BWP or the non-dormant BWP in the secondary cell.

In the embodiments of the present disclosure, the first type of DCI is also used for, in addition to being used for indicating an operating status of the terminal device on the secondary cell, scheduling data, and the second type of DCI is only used for indicating the operating status of the terminal device on the secondary cell.

The embodiments of the present disclosure implicitly distinguish the first type of DCI from the second type of DCI based on different bit values of the first bit field in the DCI or different RNTIs for scrambling the CRC of the DCI, which does not require a special signaling for indication, thereby saving signaling overhead.

The embodiments of the present disclosure do not specifically limit the first bit field, and the first bit field may be any one or more bit fields in the DCI.

For example, the first bit field can be any of the following: a frequency domain resource assignment field, a time domain resource assignment field, and a hybrid automatic repeat request (HARQ) process number field.

In a DCI format, there are some bit values or value combinations that cannot be used for actual data transmission. Therefore, these bit values or value combinations may be used for indicating the type of DCI.

If the first bit field is the frequency domain resource assignment field, the terminal device may determine the type of DCI according to a bit value of the frequency domain resource assignment field.

The embodiments of the present disclosure may determine the type of DCI according to an agreed bit value of the frequency domain resource assignment field.

For example, when the bit value is a first value, the DCI is the first type of DCI; when the bit value is a second value, the DCI is the second type of DCI.

For example, if the bit value of the frequency domain resource assignment field is 0, the terminal device may determine that the DCI is the second type of DCI; if bit values of the frequency domain resource assignment field are not all 0, the terminal device may determine the DCI is the first type of DCI. This is because for normal frequency domain resource assignment, a certain number of physical resource blocks (PRB) will be assigned to the terminal within an active BWP range. If the bit value is 0, it means that there is no PRB assignment, and accordingly, the DCI cannot be used for data scheduling, the terminal device may determine that the DCI is the second type of DCI.

Assuming that the DCI uses four bits to represent the frequency domain resource assignment field, when values of the four bits in the DCI are 0000, it means that the DCI is the second type of DCI; when the values of the four bits in the DCI are not 0000, it means that the DCI is the first type of DCI.

The above description is only based on four bits. The number of bits used by the frequency domain resource assignment field is related to a carrier bandwidth or BWP, and is not limited to four bits.

The embodiments of the present disclosure implicitly indicate the type of DCI by multiplexing the frequency domain resource assignment field, which can save signaling overhead. In addition, the method for distinguishing the DCI through the bit value is simple and does not increase processing complexity for the terminal device.

If the first bit field is the time domain resource assignment field, the terminal device may determine the type of DCI according to a bit value of the time domain resource assignment field.

The embodiments of the present disclosure may determine the type of DCI according to an agreed bit value of the time domain resource assignment field.

For example, when the bit value is a first value, the DCI is the first type of DCI; when the bit value is a second value, the DCI is the second type of DCI.

For example, if four bits are used to represent the time domain resource assignment field, the second value may be 0000 or 1111, that is, if the bit value of the time domain resource assignment field is 0000 or 1111, the terminal device may determine that the DCI is the second type of DCI; if the bit value of the time domain resource assignment field is not 0000 and 1111, the terminal device may determine the DCI is the first type of DCI.

In addition, the terminal device may also determine target information according to the bit value of the time domain resource assignment field; the terminal device may determine the type of DCI according to the target information. The target information may include at least one of the following information: k0, k2, information of a time domain resource assignment table that needs to be read by the terminal device, L, S;

k0 represents a slot interval between a slot where the DCI is located and a slot of a physical downlink shared channel (PDSCH) scheduled by the DCI, and k2 represents a slot interval between the slot where the DCI is located and a slot of a physical uplink shared channel (PUSCH) scheduled by the DCI, L represents a number of symbols assigned by a time domain resource, and S represents a starting position of a time domain symbol used by the PDSCH or the PUSCH scheduled by the DCI.

The time domain resource assignment field may be represented by four bits, and the bit value may be any value between 0-15. Assuming that the bit value is m, m may represent a row index of the time domain resource assignment table (a row index number starts from 0), that is, the row index of the time domain resource assignment table that needs to be read by the terminal device ism.

The time domain resource assignment table may include information, such as k0, k2, L, S. The terminal device may read the information in the time domain resource assignment table according to the row index indicated by the time domain resource assignment field, so as to determine k0, k2, L, and S.

The time domain resource assignment table may be configured by the network device to the terminal device through a RRC signaling.

Assuming that the target information is k0, the terminal device may determine the type of DCI according to k0.

For example, if k0 is infinity or an invalid value or k0 is not configured, the terminal device may determine that the DCI is the second type of DCI. k0 being not configured may also mean that k0 is empty.

Since k0 represents the slot interval between DCI and the PDSCH scheduled by the DCI, a value of k0 usually does not exceed 32. If k0 determined by the terminal device exceeds 32, it means that k0 is the invalid value, and the terminal device may determine that DCI is of the second type of DCI.

Assuming that the target information is k2, the terminal device may determine the type of DCI according to k2.

For example, if k2 is infinity or an invalid value or k2 is not configured, the terminal device may determine that the DCI is the second type of DCI. K2 being not configured may also mean that k2 is empty.

Since k2 represents the slot interval between DCI and the PUSCH scheduled by the DCI, a value of k2 usually does not exceed 32. If k2 determined by the terminal device exceeds 32, it means that k2 is the invalid value, and the terminal device may determine that DCI is of the second type of DCI.

The embodiments of the present disclosure use some unreasonable values to implicitly indicate the type of DCI without requiring the special signaling for indication, which can save signaling overhead.

Assuming that the target information is information of the time domain resource assignment table that needs to be read by the terminal device, the terminal device may determine the type of DCI according to the information of the time domain resource assignment table that needs to be read by the terminal device.

As an example, if an index number of a row in the time domain resource assignment table that needs to be read by the terminal device exceeds a range of index numbers that a configured time domain resource assignment table is capable of providing, the terminal device may determine that the DCI is the second type of DCI.

For example, if the configured time domain resource assignment table contains only 12 rows, but the DCI instructs the terminal device to read a 13th row of the TDRA table, which exceeds the number of rows that the TDRA table can provide. In this case, the terminal device may consider the DCI is the second type of DCI.

As another example, if the DCI instructs the terminal device to read k0 in the TDRA table, and the k0 is infinite or the invalid value, or the TDRA table does not configure k0, the terminal device may consider the DCI is the second type of DCI.

As another example, if the DCI instructs the terminal device to read k2 in the TDRA table, and the k2 is infinity or the invalid value, or the TDRA table does not configure k2, the terminal device may consider the DCI is the second type of DCI.

Assuming that the target information is L, the terminal device may determine the type of DCI according to L.

Since L represents the continuous symbol length of the PDSCH or PUSCH, if L is configured as 0, it means that there is no valid time domain symbol assignment. Therefore, the DCI cannot be used for data scheduling, and the terminal device may consider the DCI is the second type of DCI.

Of course, if L indicated by the DCI is infinite or the invalid value, the terminal device may also consider the DCI is the second type of DCI.

Assuming that the target information is S, the terminal device may determine the type of DCI according to S.

If S is not configured or S is greater than or equal to the number of symbols contained in one slot, the terminal device may determine that the DCI is the second type of DCI. This is because S represents the starting position of the time domain symbols used to transmit the PDSCH or PUSCH scheduled by DCI. If S determined according to the time domain resource assignment field is greater than or equal to the number of symbols contained in one slot, the terminal device may consider this is an unreasonable configuration and cannot be used for data transmission, and the DCI can be determined as the second type of DCI.

If one slot includes 14 time domain symbols, the largest symbol number is 13. Therefore, when S is greater than or equal to 14, the terminal device can consider this as an unreasonable configuration and cannot be used for data transmission, and may determine that the DCI is the second type of DCI.

If the first bit field is the HARQ process number field, the terminal device may determine the type of DCI according to the value of the bits in the HARQ process number field.

The embodiments of the present disclosure may determine the type of DCI according to an agreed bit value of the HARQ process number field.

For example, when the bit value is a third value, the DCI is the first type of DCI; when the bit value is a fourth value, the DCI is the second type of DCI.

For example, if four bits are used to represent the HARQ process number field, the fourth value may be 0000 or 1111, that is, if the bit value of the HARQ process number field is 0000 or 1111, the terminal device may determine that the DCI is the second type of DCI; if the bit value of the HARQ process number field is not 0000 and 1111, the terminal device may determine the DCI is the first type of DCI.

The terminal device can distinguish different types of DCI according to different RNTIs used for scrambling the CRC of the DCI.

If the RNTI used for scrambling the CRC of the DCI is a first RNTI, the terminal device may determine the DCI is the first type of DCI; if the RNTI used for scrambling the CRC of the DCI is a second RNTI, the terminal device may determine that the DCI is the second type of DCI. The first RNTI is different from the second RNTI.

After receiving the DCI sent by the network device, the terminal device may use the RNTI to descramble the CRC of the DCI. If the first RNTI can be used for descrambling, that is, the PDCCH is correctly received, the terminal device may determine the DCI is the first type of DCI; If the second RNTI can be used for descrambling, that is, the PDCCH is correctly received, the terminal device may determine that the DCI is the second type of DCI.

The first RNTI may be, for example, a cell RNTI (C-RNTI).

For example, the second RNTI may be sent by the network device to the terminal device through the RRC signaling, or the second RNTI may be pre-configured in the terminal device.

The embodiments of the present disclosure may determine the type of DCI in any of the manners described above, or may determine the type of DCI in a combination of the manners described above.

For example, the terminal device may determine the type of DCI according to the bit value of the frequency domain resource assignment field and the bit value of the time domain resource assignment field. If the bit value of frequency domain resource assignment field is 0000, the terminal device may determine that the DCI is the second type of DCI; if the bit value of the frequency domain resource assignment field is not 0000, the terminal device may further determine the type of DCI according to the bit value of the time domain resource assignment field. If the bit value of the time domain resource assignment field is 0000 or 1111, the terminal device may determine that the DCI is the second type of DCI; if the bit value of the time domain resource assignment field is not 0000 or 1111, the terminal device may determine the DCI is the first type of DCI.

The wireless communication method according to the embodiments of the present disclosure is described in detail above. An apparatus according to the embodiments of the present disclosure will be described below in conjunction with FIG. 4 to FIG. 8. The technical features described in the method embodiments are applicable to the following apparatus embodiments.

Figure 4:
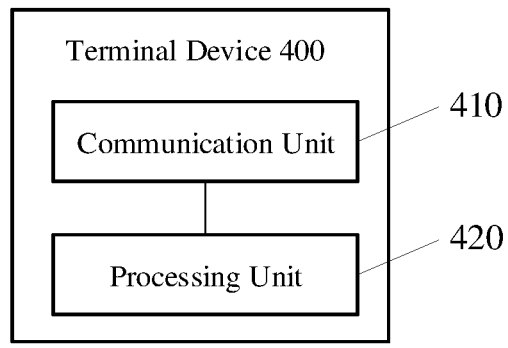
FIG. 4 is a schematic block diagram of a terminal device according to an embodiment of the present disclosure.

FIG. 4 is a schematic block diagram of a terminal device provided by an embodiment of the present disclosure. The terminal device may be any terminal device described above. The terminal device 400 shown in FIG. 4 includes a communication unit 410 and a processing unit 420, where:

the communication unit 410 is configured to receive downlink control information (DCI); and The processing unit 420 is configured to determine a type of the DCI according to a bit value of a first bit field in the DCI, and/or determine the type of the DCI according to a radio network tempory identity (RNTI) used for scrambling a cyclic redundancy check (CRC) of the DCI.

The DCI includes a first type of DCI and a second type of DCI, the first type of DCI is used for scheduling data and indicating that the terminal device operates on a dormant bandwidth part (BWP) or a non-dormant BWP in a secondary cell, and the second type of DCI is used for indicating that the terminal device operates on the dormant BWP or the non-dormant BWP in the secondary cell.

Optionally, the first bit field includes at least one of the following: a frequency domain resource assignment field, a time domain resource assignment field, and a hybrid automatic repeat request (HARQ) process number field Optionally, the first bit field is the time domain resource assignment field, and the processing unit 420 is configured to: determine the DCI is the first type of DCI, if a bit value of the time domain resource assignment field is a first value; and/or, determine the DCI is the second type of DCI, if the bit value of the time domain resource assignment field is a second value.

Optionally, the second value is 0000 or 1111.

Optionally, the first bit field is the time domain resource assignment field, and the processing unit 420 is configured to: determine target information, according to a bit value of the time domain resource assignment field; and determine the type of the DCI according to the target information, and the target information includes at least one of the following information: k0, k2, information of a time domain resource assignment table that needs to be read by the terminal device, L, S; where k0 represents a slot interval between a slot where the DCI is located and a slot of a physical downlink shared channel (PDSCH) scheduled by the DCI, and k2 represents a slot interval between the slot where the DCI is located and a slot of a physical uplink shared channel (PUSCH) scheduled by the DCI, L represents a number of symbols assigned by a time domain resource, and S represents a starting position of a time domain symbol used by the PDSCH or the PUSCH scheduled by the DCI.

Optionally, the target information is k0, and the processing unit 420 is configured to: determine the DCI is the second type of DCI, if k0 is infinity or an invalid value or k0 is not configured.

Optionally, the target information is k2, and the processing unit 420 is configured to: determine the DCI is the second type of DCI, if k2 is infinity or an invalid value or k0 is not configured.

Optionally, the target information is the information of the time domain resource assignment table that needs to be read by the terminal device, and the processing unit 420 is configured to: determine the DCI is the second type of DCI, if an index number of a row in the time domain resource assignment table that needs to be read by the terminal device exceeds a range of index numbers that a configured time domain resource assignment table is capable of providing; and/or, determine the DCI is the second type of DCI, if k0 in the time domain resource assignment table that needs to be read by the terminal device is infinite or an invalid value or k0 is not configured by the time domain resource assignment table; and/or, determine the DCI is the second type of DCI, if k2 in the time domain resource assignment table that needs to be read by the terminal device is infinite or an invalid value or k2 is not configured by the time domain resource assignment table.

Optionally, the target information is L, and the processing unit 420 is configured to determine the DCI is the second type of DCI, if L is 0.

Optionally, the target information is S, and the processing unit 420 is configured to determine the DCI is the second type of DCI, if S is not configured or S is greater than 13.

Optionally, the first bit field is the frequency domain resource assignment field, and the processing unit 420 is configured to determine the DCI is the second type of DCI, if all bit values of the frequency domain resource assignment field are 0.

Optionally, the first bit field is the HARQ process number field, and the processing unit 420 is configured to determine the DCI is the first type of DCI, if a bit value of the HARQ process number field is a third value; and/or, determine the DCI is the second type of DCI, if the bit value of the HARQ process number field is a fourth value.

Optionally, the fourth value is 0000 or 1111.

Optionally, the processing unit 420 is configured to determine the DCI is the first type of DCI, if the RNTI used for scrambling the CRC of the DCI is a first RNTI; and determine the DCI is the second type of DCI, if the RNTI used for scrambling the CRC of the DCI is a second RNTI, and the first RNTI is different from the second RNTI.

Optionally, the first RNTI is a cell RNTI.

Optionally, the second RNTI is a RNTI received by the terminal device and sent by a network device through a radio resource control signaling, or the second RNTI is a pre-configured.

Figure 5:
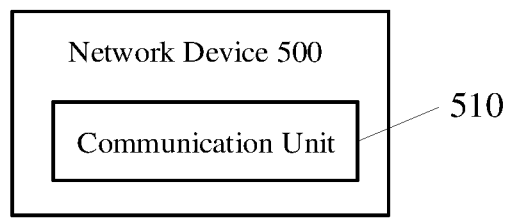
FIG. 5 is a schematic block diagram of a network device according to an embodiment of the present disclosure.

FIG. 5 is a schematic block diagram of a network device provided by an embodiment of the present disclosure. The network device may be any of the network devices described above. The network device 500 shown in FIG. 5 includes a communication unit 510, where:

the communication unit 510 is configured to send downlink control information (DCI), and the DCI includes a first bit field, and a bit value of the first bit field is used for indicating a type of the DCI, and/or a radio network tempory identity (RNTI) used for scrambling a cyclic redundancy check (CRC) of the DCI is used for indicating the type of the DCI.

The DCI includes a first type of DCI and a second type of DCI, the first type of DCI is used for scheduling data and indicating that the terminal device operates on a dormant bandwidth part (BWP) or a non-dormant BWP in a secondary cell, and the second type of DCI is used for indicating that the terminal device operates on the dormant BWP or the non-dormant BWP in the secondary cell.

Optionally, the first bit field includes at least one of the following: a frequency domain resource assignment field, a time domain resource assignment field, and a hybrid automatic repeat request (HARQ) process number field.

Optionally, a bit value of the time domain resource assignment field being a first value is used for indicating that the DCI is the first type of DCI, and the bit value of the time domain resource assignment field being a second value is used for indicating the DCI is the second type of DCI.

Optionally, the second value is 0000 or 1111.

Optionally, the bit value of the time domain resource assignment field is used for determining target information, and the target information is used for indicating the type of the DCI, and includes at least one of the following information: k0, k2, information of a time domain resource assignment table that needs to be read by the terminal device, L, S; where k0 represents a slot interval between a slot where the DCI is located and a slot of a physical downlink shared channel (PDSCH) scheduled by the DCI, and k2 represents a slot interval between the slot where the DCI is located and a slot of a physical uplink shared channel (PUSCH) scheduled by the DCI, L represents a number of symbols assigned by a time domain resource, and S represents a starting position of a time domain symbol used by the PDSCH or the PUSCH scheduled by the DCI.

Optionally, k0 being infinity or an invalid value or k0 being not configured is used for indicating the DCI is the second type of DCI.

Optionally, k2 being infinity or an invalid value or k2 being not configured is used for indicating the DCI is the second type of DCI.

Optionally, an index number of a row in the time domain resource assignment table that needs to be read by the terminal device exceeding a range of index numbers that a configured time domain resource assignment table is capable of providing is used for indicating the DCI is the second type of DCI; and/or k0 in the time domain resource assignment table that needs to be read by the terminal device being infinite or an invalid value or k0 being not configured by the time domain resource assignment table is used for indicating the DCI is the second type of DCI; and/or k2 in the time domain resource assignment table that needs to be read by the terminal device being infinite or an invalid value or k2 being not configured by the time domain resource assignment table is used for indicating the DCI is the second type of DCI.

Optionally, L being 0 is used for indicating the DCI is the second type of DCI.

Optionally, S being not configured or S being greater than 13 is used for indicating the DCI is the second type of DCI.

Optionally, all bit values of the frequency domain resource assignment field being 0 is used for indicating the DCI is the second type of DCI.

Optionally, a bit value of the HARQ process number field being a third value is used for indicating that the DCI is the first type of DCI; and/or, the bit value of the HARQ process number field being a fourth value is used for indicating the DCI is the second type of DCI.

Optionally, the fourth value is 0000 or 1111.

Optionally, the RNTI used for scrambling the CRC of the DCI being a first RNTI is used for indicating that the DCI is the first type of DCI; and the RNTI used for scrambling the CRC of the DCI being a second RNTI is used for indicating the DCI is the second type of DCI, and the first RNTI is different from the second RNTI.

Optionally, the first RNTI is a cell RNTI.

Optionally, the second RNTI is a RNTI received by the terminal device and sent by a network device through a radio resource control signaling, or the second RNTI is a preconfigured.

Optionally, in some embodiments, the above-mentioned communication module may be a communication interface or a transceiver, or an input/output interface of a communication chip or a system-on-chip. The aforementioned determining module may be one or more processors.

Figure 6:
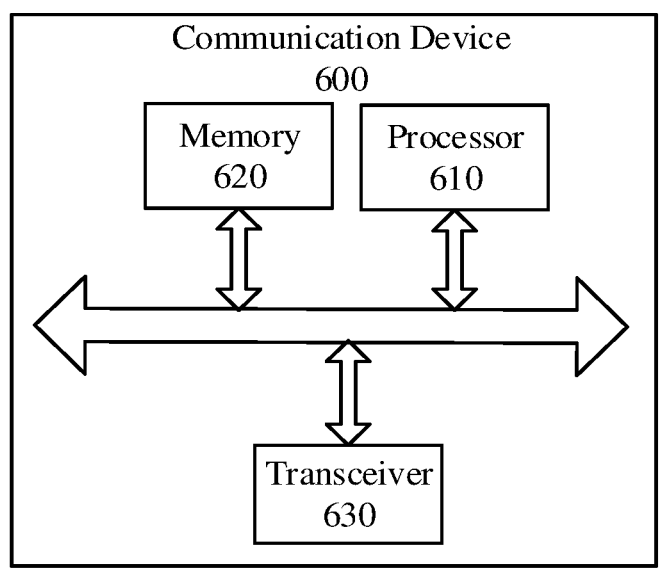
FIG. 6 is a schematic structural diagram of a communication device according to an embodiment of the present disclosure.

FIG. 6 is a schematic structural diagram of a communication device 600 according to an embodiment of the present disclosure. The communication device 600 shown in FIG. 6 includes a processor 610. The processor 610 may invoke a computer program from a memory and run the computer program, to implement the method in the embodiments of the present disclosure.

Optionally, as shown in FIG. 6, the communication device 600 may further include a memory 620. The processor 610 may invoke the computer program from the memory 620 and run the computer program, to implement the method in the embodiments of the present disclosure.

The memory 620 may be a component independent of the processor 610, or may be integrated into the processor 610.

Optionally, as shown in FIG. 6, the communication device 600 may further include a transceiver 630. The processor 610 may control the transceiver 630 to communicate with another device, and specifically, the transceiver 630 may transmit information or data to another device, or receive information or data transmitted by another device.

The transceiver 630 may include a transmitter and a receiver. The transceiver 630 may further include an antenna. There may be one or more antennas.

Optionally, the communication device 600 may be the network device in the embodiments of the present disclosure, and the communication device 600 can implement corresponding procedures implemented by the network device in various methods in the embodiments of the present disclosure. For brevity, details are not described herein again.

Optionally, the communication device 600 may be the mobile terminal/terminal in the embodiments of the present disclosure, and the communication device 600 can implement corresponding procedures implemented by the mobile terminal/terminal device in various methods in the embodiments of the present disclosure. For brevity, details are not described herein again.

Figure 7:
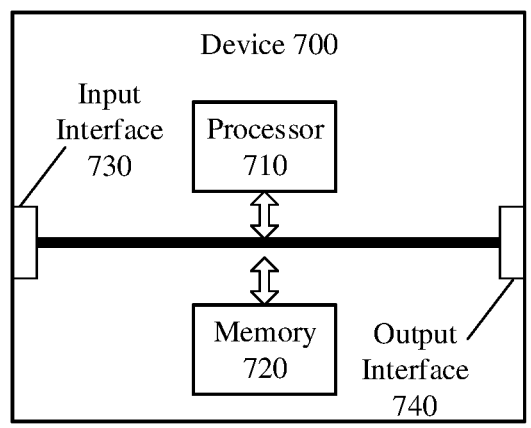
FIG. 7 is a schematic structural diagram of a device according to an embodiment of the present disclosure.

FIG. 7 is a schematic structural diagram of a device according to an embodiment of the present disclosure. The device 700 shown in FIG. 7 includes a processor 710. The processor 710 may invoke a computer program from a memory and run the computer program, to implement the method in the embodiments of the present disclosure.

Optionally, as shown in FIG. 7, the device 700 may further include a memory 720. The processor 710 may invoke the computer program from the memory 720 and run the computer program, to implement the method in the embodiments of the present disclosure.

The memory 720 may be a component independent of the processor 710, or may be integrated into the processor 710.

Optionally, the device 700 may further include an input interface 730. The processor 710 may control the input interface 730 to communicate with another device or device, and specifically, the input interface 730 may obtain information or data transmitted by another device or device.

Optionally, the device 700 may further include an output interface 740. The processor 710 may control the output interface 740 to communicate with another device or device, and specifically, the output interface 740 may output information or data to another device or device Optionally, the device may be applied in the network device according to embodiments of the present disclosure, and the device can implement corresponding procedures implemented by the network device in various methods in the embodiments of the present disclosure. For brevity, details are not described herein again.

Optionally, the device may be applied to the mobile terminal/terminal device in the embodiments of the present disclosure, and the device can implement corresponding procedures implemented by the mobile terminal/terminal device in various methods in the embodiments of the present disclosure. For brevity, details are not described herein again.

It should be noted that, the device mentioned in the embodiments of the present disclosure may be a chip, which may also be referred to as a system-level chip, a system chip, a chip system, a system on chip, or the like.

Figure 8:
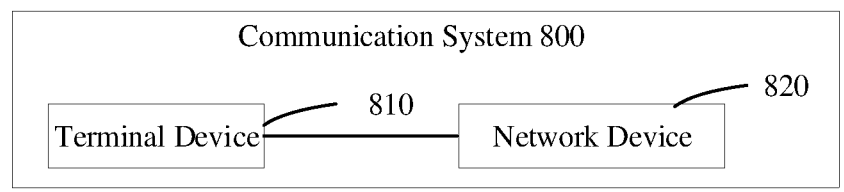
FIG. 8 is a schematic structural diagram of a communication system provided by an embodiment of the present disclosure.

FIG. 8 is a schematic structural diagram of a communication system 800 according to an embodiment of the present disclosure. The communication system 800 shown in FIG. 8 includes a terminal device 810 and a network device 820.

The terminal device 810 can implement corresponding functions implemented by the terminal device in the foregoing method and the network device 820 can implement corresponding functions implemented by the network device in the foregoing method. For brevity, details are not described herein again.

It should be understood that, the processor of the embodiments of the present disclosure may be an integrated circuit chip, has a signal processing capability, the steps of the foregoing method embodiment may be implemented by using a hardware integrated logic circuit in the processor and/or implemented by using an instruction in a software form. The foregoing processor may be a general purpose processor, a digital signal processor (DSP), a field programmable gate array (FPGA), an application specific integrated circuit (ASIC) or another programmable logic device, a transistor logic device, or a discrete hardware component. The foregoing general purpose processor may be a microprocessor, or may be any conventional processor, or the like. Steps of the methods disclosed with reference to the embodiments of the present disclosure may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing method embodiments in combination with hardware of the processor.

It should be understood that, the memory in the embodiments of the present disclosure may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), and is used as an external cache. By way of examples but of no limitation, many forms of RAM are available, for example, a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synclink dynamic random access memory (SLDRAM), and a direct rambus random access memory (DRRAIVI). It should be noted that, the memory of the system and the method described in this embodiment of the present disclosure is intended to include but is not limited to these memories and any other suitable type of memory.

It should be understood that, the memory is an example but is not intended for limitation. For example, the memory in the embodiments of the present disclosure may alternatively be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct rambus RAM (DR RAM), and the like. That is, the memory described in this embodiment of the present disclosure is intended to include but is not limited to these memories and any other suitable type of memory.

An embodiment of the present disclosure further provides a computer readable storage medium. The computer readable storage medium is configured to store a computer program.

Optionally, the computer readable storage medium may be applied to the network device in the embodiments of the present disclosure, and the computer program enables a computer to execute a corresponding procedure implemented by the network device in the methods of the embodiments of the present disclosure. For brevity, details are not described herein again.

Optionally, the computer readable storage medium may be applied to the mobile terminal/terminal device in the embodiments of the present disclosure, and the computer program enables the computer to execute a corresponding procedure implemented by the mobile terminal/terminal device in the methods of the embodiments of the present disclosure. For brevity, details are not described herein again.

The present disclosure further provides a computer program product. The computer program product includes a computer program instruction.

Optionally, the computer program product may be applied to the network device in the embodiments of the present disclosure, and the computer program instruction enables the computer to execute a corresponding procedure implemented by the network device in the methods of the embodiments of the present disclosure. For brevity, details are not described herein again.

Optionally, the computer program product may be applied to the mobile terminal/terminal device in the embodiments of the present disclosure, and the computer program instruction enables the computer to execute a corresponding procedure implemented by the mobile terminal/terminal device in the methods of the embodiments of the present disclosure. For brevity, details are not described herein again.

The present disclosure further provides a computer program.

Optionally, the computer program may be applied to the network device in the embodiments of the present disclosure, and when run on a computer, the computer program instruction enables the computer to execute a corresponding procedure implemented by the network device in the methods of the embodiments of the present disclosure. For brevity, details are not described herein again.

Optionally, the computer program may be applied to the mobile terminal/terminal device in the embodiments of the present disclosure, and when run on a computer, the computer program instruction enables the computer to execute a corresponding procedure implemented by the mobile terminal/terminal device in the methods of the embodiments of the present disclosure. For brevity, details are not described herein again.

A person of ordinary skill in the art may be aware that, in combination with the examples described in the embodiments disclosed in this specification, units and algorithm steps may be implemented by using electronic hardware or a combination of computer software and electronic hardware. Whether these functions are executed by means of hardware or software depends on specific applications and design constraints of the technical solutions. A person skilled in the art may use different methods to implement the described functions for each particular application, but it should not be considered that the implementation goes beyond the scope of the present disclosure.

A person skilled in the art may clearly understand that, for simple and clear description, for specific work processes of the foregoing described system, apparatus, and unit, reference may be made to corresponding process in the foregoing method embodiments, and details are not described herein again.

In the several embodiments provided in the present disclosure, it should be understood that the disclosed system, apparatus, and method may be implemented in other manners.

For example, the apparatus embodiments described above are merely examples.

For example, the unit division is merely logical function division, and there may be other division manners in actual implementation.

For example, a plurality of units or components may be combined or integrated into another system, or some features may be ignored or not performed.

In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and the parts displayed as units may or may not be physical units, may be located in one position, or may be distributed on multiple network units. Some of or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

Described above are merely specific implementations of the present disclosure, but the protection scope of the present disclosure is not limited thereto. Changes or replacements readily figured out by any person skilled in the art within the technical scope disclosed in the present disclosure shall be covered by the protection scope of the present disclosure. Therefore, the protection scope of the present disclosure shall be subject to the protection scope of the claims.

What is claimed is:

1. A method for determining a downlink control information type, comprising:
   receiving, by a terminal device, downlink control information (DCI); and
   determining, by the terminal device, a type of the DCI according to a bit value of a first bit field in the DCI, and/or determining, by the terminal device, the type of the DCI according to a radio network tempory identity (RNTI) used for scrambling a cyclic redundancy check (CRC) of the DCI;
   wherein the DCI is a first type of DCI and a second type of DCI, the first type of DCI is used for scheduling data and indicating that the terminal device operates on a dormant bandwidth part (BWP) or a non-dormant BWP in a secondary cell, and the second type of DCI is used for indicating that the terminal device operates on the dormant BWP or the non-dormant BWP in the secondary cell.

2. The method according to claim 1, wherein the first bit field comprises at least one of the following: a frequency domain resource assignment field, a time domain resource assignment field, and a hybrid automatic repeat request (HARQ) process number field.

3. The method according to claim 2, wherein the first bit field is the time domain resource assignment field, the determining, by the terminal device, the type of the DCI according to the bit value of the first bit field in the DCI comprises:
   determining, by the terminal device, the DCI is the first type of DCI, if a bit value of the time domain resource assignment field is a first value; and/or
   determining, by the terminal device, the DCI is the second type of DCI, if the bit value of the time domain resource assignment field is a second value.

4. The method according to claim 2, wherein the first bit field is the frequency domain resource assignment field, and the determining, by the terminal device, the type of the DCI according to the bit value of the first bit field in the DCI comprises:
   determining, by the terminal device, the DCI is the second type of DCI, if all bit values of the frequency domain resource assignment field are 0.

5. The method according to claim 2, wherein the first bit field is the HARQ process number field, and the determining, by the terminal device, the type of the DCI according to the bit value of the first bit field in the DCI comprises:
   determining, by the terminal device, the DCI is the first type of DCI, if a bit value of the HARQ process number field is a third value; and/or,
   determining, by the terminal device, the DCI is the second type of DCI, if the bit value of the HARQ process number field is a fourth value.

6. A method for determining a downlink control information type, comprising:
   sending, by a network device, downlink control information (DCI), wherein the DCI comprises a first bit field, and a bit value of the first bit field is used for indicating a type of the DCI, and/or a radio network tempory identity (RNTI) used for scrambling a cyclic redundancy check (CRC) of the DCI is used for indicating the type of the DCI;
   wherein the DCI is a first type of DCI and a second type of DCI, the first type of DCI is used for scheduling data and indicating that a terminal device operates on a dormant bandwidth part (BWP) or a non-dormant BWP in a secondary cell, and the second type of DCI is used for indicating that the terminal device operates on the dormant BWP or the non-dormant BWP in the secondary cell.

7. The method according to claim 6, wherein the first bit field comprises at least one of the following: a frequency domain resource assignment field, a time domain resource assignment field, and a hybrid automatic repeat request (HARQ) process number field.

8. The method according to claim 7, wherein a bit value of the time domain resource assignment field is used for determining target information, and the target information is used for indicating the type of the DCI, and comprises at least one of the following information: k0, k2, information of a time domain resource assignment table that needs to be read by the terminal device, L, S;
   wherein k0 represents a slot interval between a slot where the DCI is located and a slot of a physical downlink shared channel (PDSCH) scheduled by the DCI, and k2 represents a slot interval between the slot where the DCI is located and a slot of a physical uplink shared channel (PUSCH) scheduled by the DCI, L represents a number of symbols assigned by a time domain resource, and S represents a starting position of a time domain symbol used by the PDSCH or the PUSCH scheduled by the DCI.

9. The method according to claim 8, wherein an index number of a row in the time domain resource assignment table that needs to be read by the terminal device exceeding a range of index numbers that a configured time domain resource assignment table is capable of providing is used for indicating the DCI is the second type of DCI; and/or
k0 in the time domain resource assignment table that needs to be read by the terminal device being infinite or an invalid value or k0 being not configured by the time domain resource assignment table is used for indicating the DCI is the second type of DCI; and/or
k2 in the time domain resource assignment table that needs to be read by the terminal device being infinite or an invalid value or k2 being not configured by the time domain resource assignment table is used for indicating the DCI is the second type of DCI.

10. The method according to claim 7, wherein all bit values of the frequency domain resource assignment field being 0 is used for indicating the DCI is the second type of DCI.

11. A terminal device, comprising a processor and a memory, wherein the memory is configured to store a computer program, and the processor is configured to call and run the computer program stored in the memory, and perform:
receiving downlink control information (DCI); and
determining a type of the DCI according to a bit value of a first bit field in the DCI, and/or determining the type of the DCI according to a radio network tempory identity (RNTI) used for scrambling a cyclic redundancy check (CRC) of the DCI;
wherein the DCI is a first type of DCI and a second type of DCI, the first type of DCI is used for scheduling data and indicating that the terminal device operates on a dormant bandwidth part (BWP) or a non-dormant BWP in a secondary cell, and the second type of DCI is used for indicating that the terminal device operates on the dormant BWP or the non-dormant BWP in the secondary cell.

12. The terminal device according to claim 11, wherein the first bit field comprises at least one of the following: a frequency domain resource assignment field, a time domain resource assignment field, and a hybrid automatic repeat request (HARQ) process number field.

13. The terminal device according to claim 12, wherein the first bit field is the time domain resource assignment field, and the processor is configured to:
determine target information, according to a bit value of the time domain resource assignment field; and
determine the type of the DCI according to the target information, wherein the target information comprises at least one of the following information: k0, k2, information of a time domain resource assignment table that needs to be read by the terminal device, L, S;
wherein k0 represents a slot interval between a slot where the DCI is located and a slot of a physical downlink shared channel (PDSCH) scheduled by the DCI, and k2 represents a slot interval between the slot where the DCI is located and a slot of a physical uplink shared channel (PUSCH) scheduled by the DCI, L represents a number of symbols assigned by a time domain resource, and S represents a starting position of a time domain symbol used by the PDSCH or the PUSCH scheduled by the DCI.

14. The terminal device according to claim 13, wherein the target information is k0, and the processor is configured to:
determine the DCI is the second type of DCI, if k0 is infinity or an invalid value or k0 is not configured.

15. The terminal device according to claim 12, wherein the first bit field is the frequency domain resource assignment field, and the processor is configured to:
determine the DCI is the second type of DCI, if all bit values of the frequency domain resource assignment field are 0.

16. A network device comprising a processor and a memory, wherein the memory is configured to store a computer program, and the processor is configured to call and run the computer program stored in the memory, and execute a method for determining a downlink control information type, the method comprising:
sending downlink control information (DCI), wherein the DCI comprises a first bit field, and a bit value of the first bit field is used for indicating a type of the DCI, and/or a radio network tempory identity (RNTI) used for scrambling a cyclic redundancy check (CRC) of the DCI is used for indicating the type of the DCI;
wherein the DCI is a first type of DCI and a second type of DCI, the first type of DCI is used for scheduling data and indicating that a terminal device operates on a dormant bandwidth part (BWP) or a non-dormant BWP in a secondary cell, and the second type of DCI is used for indicating that the terminal device operates on the dormant BWP or the non-dormant BWP in the secondary cell.

17. The network device according to claim 16, wherein the first bit field comprises at least one of the following: a frequency domain resource assignment field, a time domain resource assignment field, and a hybrid automatic repeat request (HARQ) process number field.

18. The network device according to claim 17, wherein all bit values of the frequency domain resource assignment field being 0 is used for indicating the DCI is the second type of DCI.

19. The network device according to claim 17, wherein a bit value of the HARQ process number field being a third value is used for indicating that the DCI is the first type of DCI; and/or, the bit value of the HARQ process number field being a fourth value is used for indicating the DCI is the second type of DCI.

20. The network device according to claim 16, wherein the RNTI used for scrambling the CRC of the DCI being a first RNTI is used for indicating that the DCI is the first type of DCI; and
the RNTI used for scrambling the CRC of the DCI being a second RNTI is used for indicating the DCI is the second type of DCI, wherein the first RNTI is different from the second RNTI.

* * * * *